Aug. 19, 1941.    J. H. REED    2,252,947
SPEED CONTROL FOR MOTOR VEHICLES OPERATED BY INTERNAL COMBUSTION ENGINES
Filed Dec. 23, 1938    3 Sheets-Sheet 1
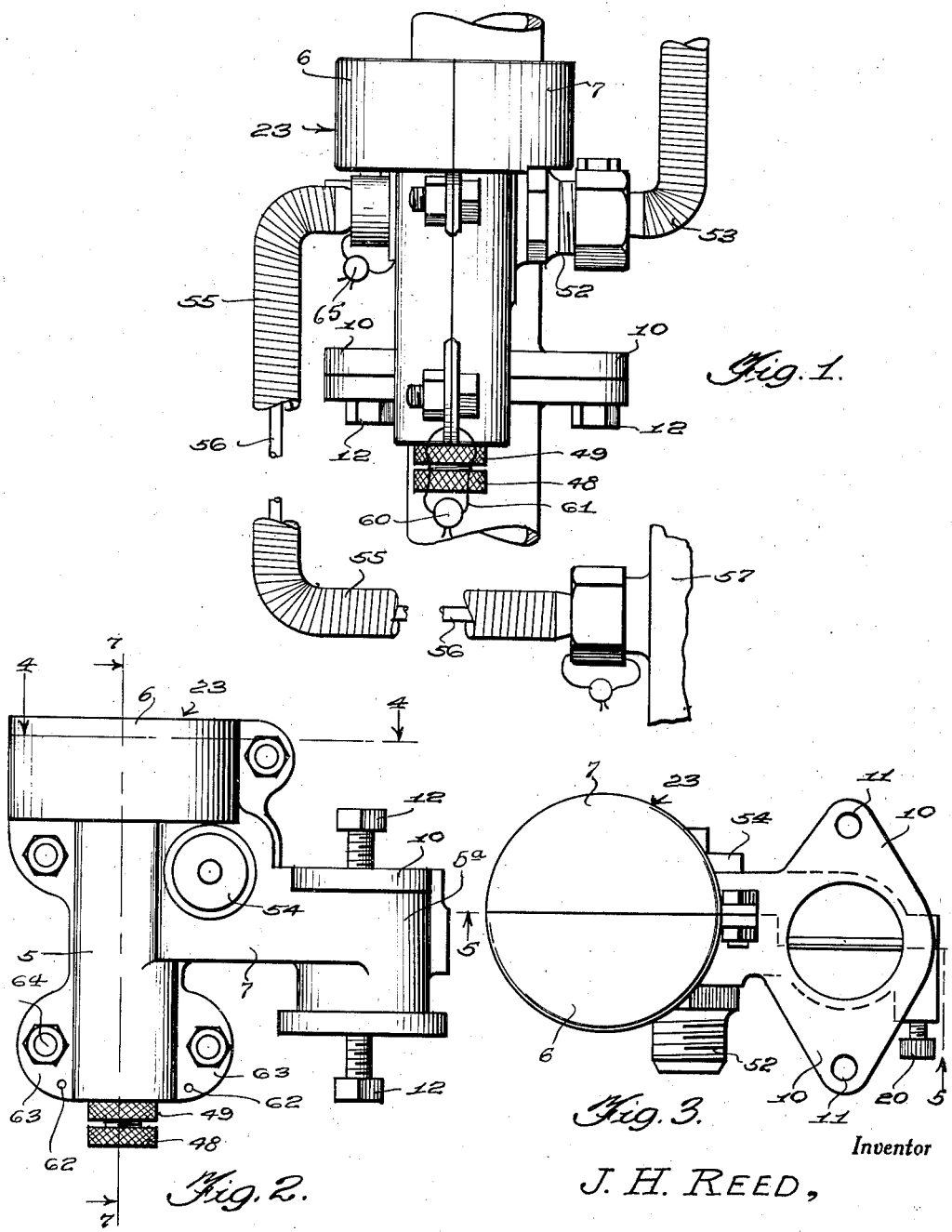
Inventor
J. H. REED,
By Clarence A. O'Brien
and Hyman Berman
Attorneys

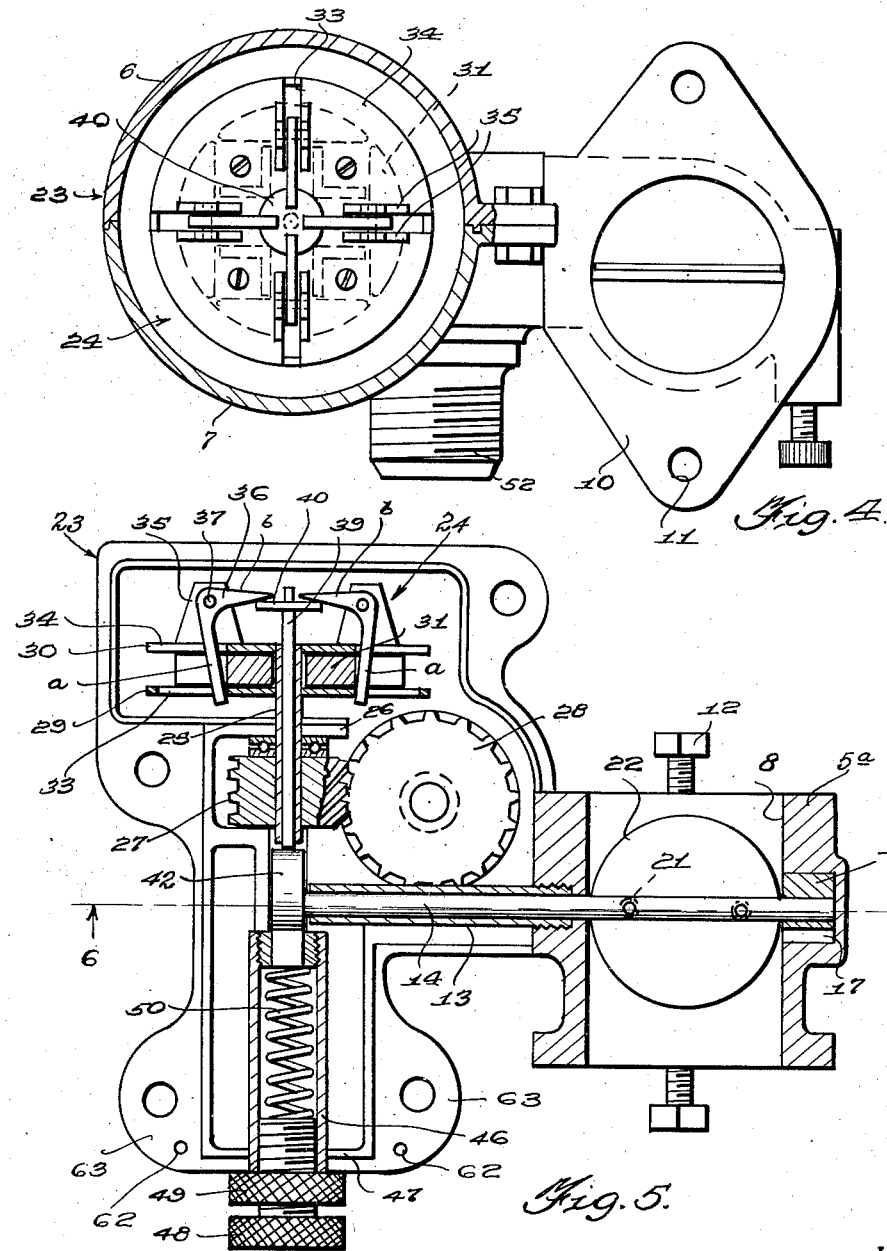

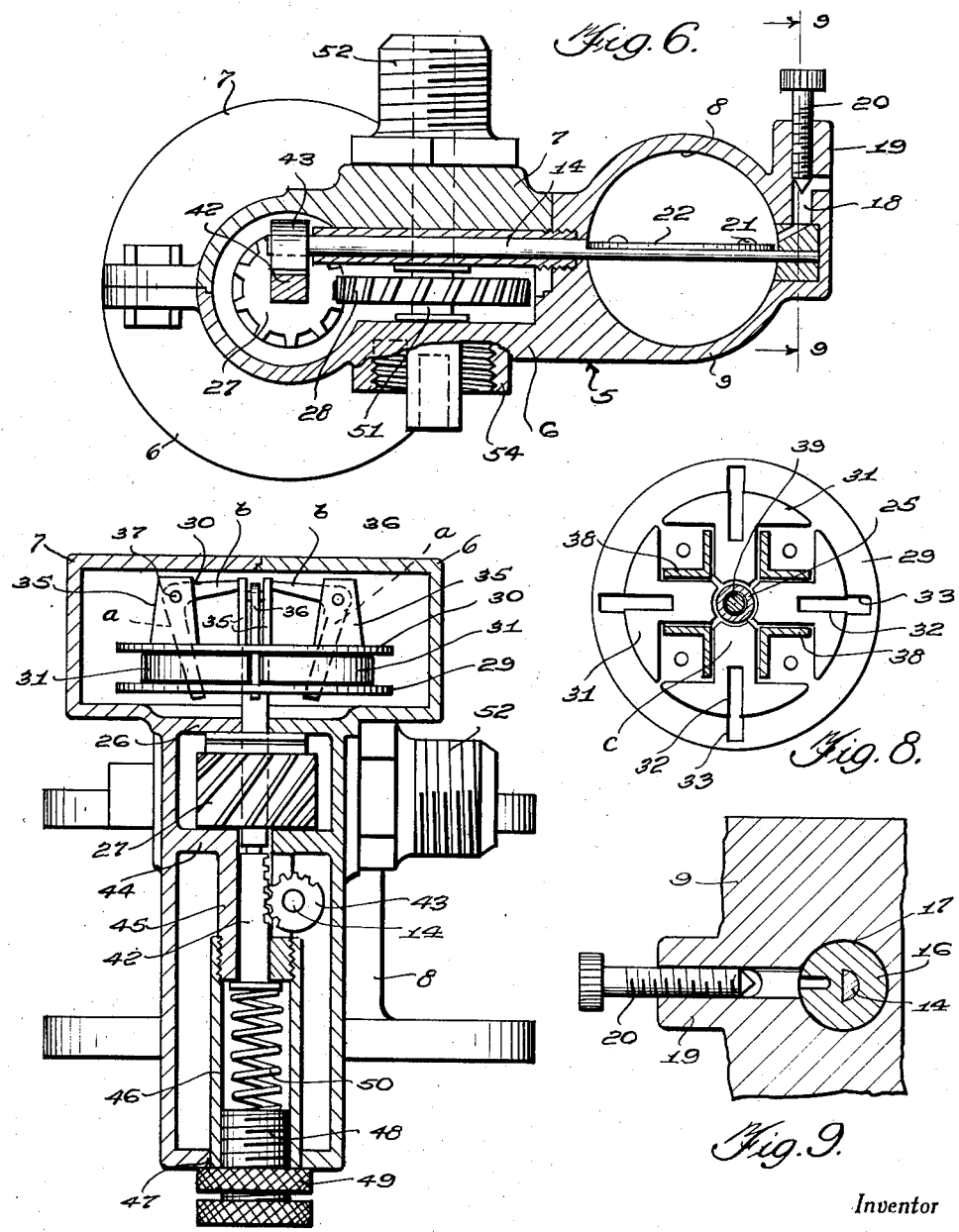

Patented Aug. 19, 1941

2,252,947

UNITED STATES PATENT OFFICE 2,252,947

SPEED CONTROL FOR MOTOR VEHICLES OPERATED BY INTERNAL COMBUSTION ENGINES

James Howard Reed, Brownsville, Tex.

Application December 23, 1938, Serial No. 247,535

3 Claims. (Cl. 264—17)

This invention appertains to new and useful improvements in speed control mechanism for internal combustion engines.

The principal object of the present invention is to provide a simple and effective device regulated by the speed of the vehicle for controlling the motive power and thereby the consequent speed of the vehicle.

Another important object of the invention is to provide a device of the character stated which will afford an equal balance and consequent flexibility which is practically impossible to gain through the use of a ball type governor.

Another object of the invention is to provide a device of the character stated which may be easily adjusted and after having been properly adjusted, may be sealed in that adjusted position.

Another important object of the invention is to provide a device which is especially adapted to apply to the usual speedometer drive of any make of motor vehicle.

Still another object of the invention is to provide a device that governs the speed of the motor in such a manner as to permit the use of the full motor power when the vehicle is being operated in the lower gears, but which when operating in the high gear the speed control mechanism operates to the fullest extent, limiting the speed of the vehicle to any predetermined velocity.

Still a further object of the invention is to provide a device in which is incorporated a gasoline saving device for vehicles operating on liquid fuel.

These and various other objects and advantages of the invention will become apparent to the reader of the following specification:

In the drawings:

Figure 1 represents a fragmentary side elevational view of the device shown attached to the intake manifold pipe.

Figure 2 is a front elevational view of the control.

Figure 3 is a top plan view.

Figure 4 is a horizontal sectional view on line 4—4 of Figure 2.

Figure 5 is a vertical sectional view taken substantially on line 5—5 of Figure 3.

Figure 6 is a horizontal sectional view taken substantially on line 6—6 of Figure 5.

Figure 7 is a vertical sectional view taken substantially on line 7—7 of Figure 2.

Figure 8 is a horizontal sectional view through the governor mechanism with the bell crank levers removed.

Figure 9 is a fragmentary detailed sectional view on line 9—9 of Figure 6.

Referring to the drawings wherein like numerals designate like parts, it can be seen that numeral 5 represents the body of the control which is made up of a sectional casting consisting of the sections 6 and 7 with a casting 5a projecting laterally from the section 6. The casting 5a is vertically bored to provide the passageway 8 for alignment with the intake manifold. This casting is adapted for interposition in the usual engine intake fuel pipe and has laterally extending ears 10 at its upper and lower portions apertured as at 11 to receive securing bolts 12.

From between the sections 6—7 extends the sleeve 13 through which projects the shaft 14. The sleeve 13 is threadedly engaged as at 15 in the end portion 9 of the casting 6 (see Figure 5) and the shaft 14 projects beyond the sleeve and across the passageway 8, the same terminating in the valve element 16 which is in the form of a rotor having the port 17 therein capable of communicating the passageway 8 with the duct 18 which extends through the formation 19 in which is located the threaded needle valve 20 for regulating the passage of air through the duct 18.

On the shaft 14 in the passageway 8 and secured by suitable means 21 is the butterfly valve 22.

As is clearly shown in Figures 4, 5 and 8, the governor mechanism consists of the hollow head structure generally referred to by numeral 23 constructed of the case sections 6 and 7 and in this is the governor mechanism generally referred to by numeral 24. This mechanism consists in construction of the hollow shaft 25 generally extending upwardly through the ledge 26 and having keyed or otherwise secured to its lower portion the worm 27 with which the gear 28 meshes.

A pair of disks 29 and 30 are provided on the upper end of the hollow shaft 25 in vertically spaced relation and between these disks 29 and 30 are operative the T-shaped segments 31 each of which is slotted as at 32 and these slots are in registry with the slots 33 and 34 in the disks 29 and 30.

Ears 35 extend upwardly from the upper disk 34 for supporting the bell crank arms 36, these ears being arranged in pairs with the bell crank arms pivotally mounted between the same as at 37. The bell crank arms each consists of the depending leg $a$ and the tapering foot $b$ and these are disposed in a slightly acute angular relation with respect to each other.

Right-angularly shaped guide members 38 are interposed between the disks 29 and 30, these guide members having opposed walls in parallel spaced relation to define guideways for the shank portions $c$ of the said segmental weight members 31, which can of course be of lead or any other suitable material.

A control rod 39 extends downwardly in the hollow shaft 25 and has a plate 40 at its upper end against which the foot portions $b$ of the bell crank arms 36 are engaged.

The lower end of this rod 39 bears against the rack bar 42, which rack bar in turn meshes with the gear 43 on the shaft 14.

The gear 27 operates between the ledge 26 and the ledge 44 and depending from the ledge 44 is the barrel 45 containing the rack bar 42 and threadedly connected to this barrel 45 is the tube 46 which extends downwardly and engages into the opening 47 in the lower end of the casing. Threadedly engaged into the tube 46 is the threaded plug 48 which has the jamb nut 49 thereon. Interposed between this plug 48 and the rack bar 42 is the coiled compressible spring 50. Obviously by adjusting the plug 48 the tension of the spring 50 can be varied.

The gear 28 is located on the short shaft 51 which extends through the sections 6 and 7, the section 7 having the threaded nipple 52, to which a flexible shaft tube 53 is connectible while the section 6 has the internally threaded socket 54 for permitting connection of the flexible shaft conduit 55 thereto, this having its shaft 56 extending to the usual speedometer 57, while the shaft of the section 53 extends to the usual drive for the speedometer.

The seal 60 is on the wire element 61 which is trained through the openings 62 in the ears 63, through which bolts 64 are disposed to secure the sections of the case 23 together. This seal 60 and the seal 65 serve to prevent unauthorized opening of the case to permit tampering with the governor.

It can be seen in Figure 1, that this governor control is mounted in the speedometer drive line. Thus the short shaft 51 driven by the speedometer drive line rotates the governor mechanism 24. Resistance to the operation of the governor mechanism 24 is adjustably afforded by the spring 50 and the adjusting screw 48. In the event of high speed, exceeding a speed predetermined, the governor mechanism 24 will be rotated by the speedometer drive line, shaft 51 and gears 27 and 28 to an extent at which the weights 31 have moved the depending legs a of the bell-crank 36 outwardly, with the result that the foot portion b of said bell-crank will force the plate 40 downwardly along with the stem 39 against the compression of the spring 50, moving the rack 42 downwardly. This operation of the rack 42 will rotate the pinion 43 (see Figure 7) and cause rotation of the shaft 14, moving the butterfly valve 22 toward its closed position. Obviously, as the speed of rotation of the speedometer drive shaft lessens, the effect of the spring 50 will be to rock the bell-crank 36 so that the weights 31 are returned and in this operation the spring 50 will lift the rack 42 and result again in the opening of the valve 22. Thus, the governor mechanism automatically takes care of holding the speed of the vehicle to a definite value. Obviously, when the speed setting is to be changed, all that is required is actuation of the set screw 48 to the desired extent and the retention of the screw against self-adjusting by means of the jamb nut 49.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

1. A governor apparatus comprising a controlled shaft, a controlling shaft, a rack, a gear carried by the controlled shaft and meshing with the rack, spring means urging the rack in one direction, a rotatable assembly including a plurality of centrifugally movable weight members, bell-cranks mounted on the rotary assembly and each having one leg engaged with a corresponding weight member, a slidable stem adapted to be reciprocated by the remaining legs of the bell-cranks, said stem being operative against the rack to slide said rack and rotate the controlled shaft when the weight members respond to centrifugal force, and drive means between the controlling shaft and rotary assembly, said rotary assembly comprising a pair of plates, angle members interposed between the plates to space the plates apart and define guideways, said weights having portions of themselves slidably disposed in said guideways.

2. A governor apparatus comprising a controlled shaft, a controlling shaft, a rack, a gear carried by the controlled shaft and meshing with the rack, spring means urging the rack in one direction, a rotatable assembly including a plurality of centrifugally movable weight members, bell-cranks mounted on the rotary assembly and each having one leg engaged with a corresponding weight member, a slidable stem adapted to be reciprocated by the remaining legs of the bell-cranks, said stem being operative against the rack to slide said rack and rotate the controlled shaft when the weight members respond to centrifugal force, and drive means between the controlling shaft and rotary assembly, said rotary assembly comprising a pair of plates, angle members interposed between the plates to space the plates apart and define guideways, said weights having portions of themselves slidably disposed in said guideways, said weight members being of T-shape and having their depending portions disposed in the said guideways.

3. A governor apparatus comprising a controlled shaft, a controlling shaft, a rack, a gear carried by the controlled shaft and meshing with the rack, spring means urging the rack in one direction, a rotatable assembly including a plurality of centrifugally movable weight members, bell-cranks mounted on the rotary assembly and each having one leg engaged with a corresponding weight member, a slidable stem adapted to be reciprocated by the remaining legs of the bell-cranks, said stem being operative against the rack to slide said rack and rotate the controlled shaft when the weight members respond to centrifugal force, and drive means between the controlling shaft and rotary assembly, said rotary assembly comprising a pair of plates, angle members interposed between the plates to space the plates apart and define guideways, said weights having portions of themselves slidably disposed in said guideways, said weight members being of T-shape and having their depending portions disposed in the said guideways, said plates and T-shaped weight members being formed with registering slots into which is disposed the depending leg portions of the bell-cranks.

JAMES HOWARD REED.